Dec. 12, 1950  V. E. TINDER  2,533,853
SALAD BOWL
Filed June 23, 1947
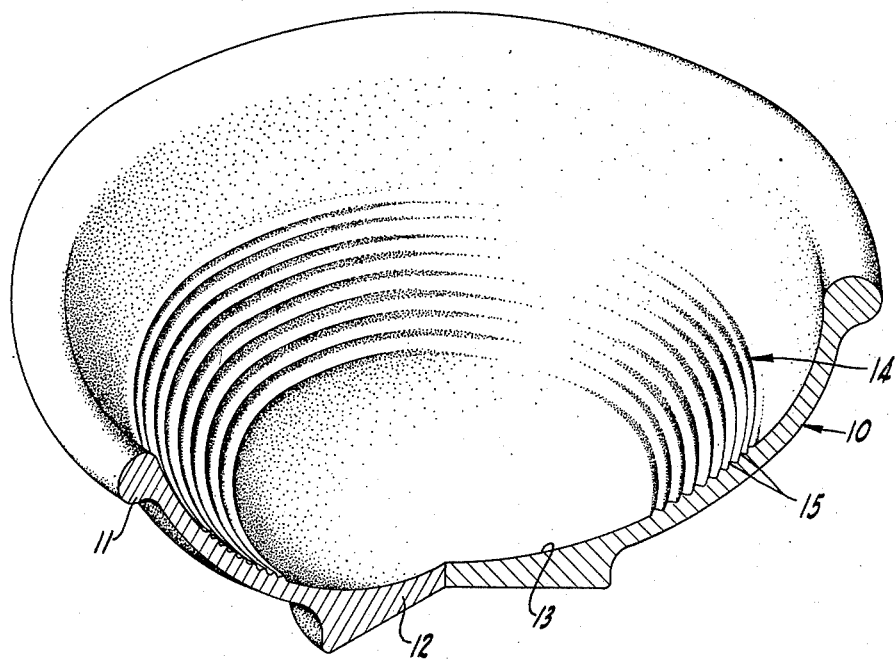
INVENTOR
VIOLA EDNA TINDER
BY
Mellin & Hanscom
ATTORNEYS Patented Dec. 12, 1950

2,533,853

UNITED STATES PATENT OFFICE 2,533,853

SALAD BOWL

Viola E. Tinder, Auburn, Calif.

Application June 23, 1947, Serial No. 756,472

3 Claims. (Cl. 65—15)

The present invention pertains to bowls, and is more particularly directed to bowls for preparing salads and other tossed or mixed foods.

In the making of dressings for salads, onions or garlic are usually required to impart the desired taste to the mixture. Heretofore, it has been usual practice to include the garlic or onions in very finely chopped form, which leaves an undesired odor on a person's breath. Although garlic or onions are very strong and pungent, only their essence need be used, and, if dissolved in the salad oil, the strong ingredients will not remain on a person's breath after consumption of the salad. Garlic and similar food substances can be included in salad dressings in dissolved form by rubbing a clove with a teaspoon of salt, but such procedure is very slow in addition to being extremely messy, the odor remaining on the person's hands for an appreciable time.

Accordingly, it is an object of the present invention to provide a salad bowl which enables garlic, onions, citrus fruit peel, celery, etc., to be dissolved in salad dressings with facility in a comparatively simple and rapid manner, thus enabling the preparation of a tossed or mixed salad containing strong and pungent condiments, which will not remain on a person's breath.

One form which the invention may assume is exemplified in the following description and illustrated by way of example in the accompanying drawing, in which the single figure is a prospective view of a salad bowl, with a part thereof broken away to disclose a transverse section.

As shown in the drawing, the bowl is a concave vessel 10, having an upper rim 11 and a lower central base 12 on which the bowl may be supported on a table or other suitable stand (not shown). Adjacent the bottom 13 of the bowl on its interior, a roughened bowl surface or area 14 is provided, which may assume several forms. As specifically disclosed in the drawing, the roughened area includes a plurality of concentric ribs 15, generally angular in cross-section extending part way up the inner surface of the bowl from its smooth bottom portion 13. This roughened surface may be of any suitable extent, and need not continue upwardly to the bowl rim 11.

The bowl may be made of any suitable material, with the roughened surface 14 either an integral part thereof, or it may be made of a metal or other material embedded in the main body of the bowl. The bowl itself may be made of wood, metal, pottery, porcelain or any other suitable material.

In the making of a salad in the bowl, the strong and pungent condiments are rubbed on the abrasive surface 14, to effect extraction of the essence in a comparatively rapid manner. In the event that it is not desired to hold the condiment in the hand, it may be held by any suitable equipment, as on the end of a fork. For example, in the making of a salad dressing, a clove of garlic would first be rubbed over the abrasive, roughened surface 14 until its essence is extracted. Then a green onion and a few parsley leaves could be similarly rubbed on the abrasive surface, and salt, vinegar, wine and oil added, whereupon the entire mass is mixed together. Such mixture can take place very readily, since the roughened surface is adjacent the bottom 13 of the bowl, and the essence of the garlic, onion and parsley will be covered, or nearly covered, by the oil and vinegar added later.

It is thus apparent that the essence of condiments of any desired type may be extracted in a comparatively few seconds by the use of the above described salad bowl, and that such essence will dissolve readily in the ingredients added thereto. The bowl can be used in connection with various food substances, several of which have been mentioned above, enabling a single bowl to be employed in making various kinds of salad dressings.

The bowl extracts the desired essences of the condiments or other food stuffs, and avoids any necessity for including essential ingredients of the dressing in the salad in chopped or finely divided form, which leaves undesired odors on a person's breath. Instead, the dissolving of the pungent condiments in the remainder of the salad dressing insures their uniform dispersion through the dressing and the salad. In short, the invention enables delectable and palatable salads, and other mixed foods, to be prepared without the inclusion of many of their prior shortcomings, some of which have been specified above.

While I have illustrated and described my invention in detail, it is to be understood that various changes may be made therein by those skilled in the art without departing from the invention as defined in the appended claims.

Having thus described my invention, what I claim and desire to secure by Letters Patent is:

1. A salad bowl comprising a bowl-shaped imperforate body defining an interior surface, the internal walls of which are continuously curved upwardly from a central bottom point constituting a substantially parabolic curve in vertical section, the lower central portion of said surface and the upper portion adjacent the edge of the bowl having a relatively smooth contour and an intermediate circular portion having an abrasive surface formed by undulations in the curvature.

2. The bowl as set forth in claim 1 in which the undulations are formed by concentric evenly spaced ridges of successively increasing diameter as they progress upwardly to define ridges of equal height extending from the surface in the direction of the axis of the parabolic curve.

3. The bowl as set forth in claim 1 in which the undulations are formed by concentric evenly spaced ridges of successively increasing diameter as they progress upwardly to define ridges of equal height extending from the surface in the direction of the axis of the parabolic curve, and in which all of the ridges are concentric with the axis of the parabolic curve and each is formed by a pair of angularly related surfaces the apex of which points inwardly and upwardly.

VIOLA E. TINDER.

REFERENCES CITED

The following references are of record in the file of this patent:

UNITED STATES PATENTS

| Number | Name | Date |
|---|---|---|
| D. 27,288 | Ripley | July 6, 1897 |
| D. 35,232 | Muscenheim | Oct. 29, 1901 |
| 153,221 | Kirchner | July 21, 1874 |
| 176,358 | Savage | Apr. 18, 1876 |
| 229,467 | Remhof | June 29, 1880 |
| 1,038,647 | Pitt | Sept. 17, 1912 |
| 1,099,996 | Parsons | June 16, 1914 |
| 1,915,849 | Crimmel | June 27, 1933 |
| 2,189,136 | Dolphin | Feb. 6, 1940 |
| 2,240,842 | Gehring et al. | May 6, 1942 |
| 2,302,138 | Nicholson | Nov. 17, 1942 |
| 2,342,892 | Prinz | Feb. 29, 1944 |

FOREIGN PATENTS

| Number | Country | Date |
|---|---|---|
| 10,956 | Great Britain | May 3, 1897 |
| 217,689 | Great Britain | June 26, 1924 |
| 353,195 | Great Britain | July 23, 1931 |
| 496,016 | Great Britain | Nov. 23, 1938 |
| 48,246 | Netherlands | Apr. 15, 1940 |